United States Patent
Mainka et al.

(10) Patent No.: US 12,553,225 B2
(45) Date of Patent: Feb. 17, 2026

(54) OUTLET ELEMENT FOR A DRINKING WATER DISPENSER

(71) Applicant: Grohe AG, Hemer (DE)

(72) Inventors: David Mainka, Iserlohn (DE); Matthias Schlüter, Dortmund (DE); Frank Spiekermann, Menden (DE); Felix Mühling, Menden (DE)

(73) Assignee: GROHE AG, Hemer (DE)

( * ) Notice: Subject to any disclaimer, the term of this patent is extended or adjusted under 35 U.S.C. 154(b) by 467 days.

(21) Appl. No.: 17/914,569

(22) PCT Filed: Mar. 2, 2021

(86) PCT No.: PCT/EP2021/055194
§ 371 (c)(1),
(2) Date: Oct. 12, 2022

(87) PCT Pub. No.: WO2021/190876
PCT Pub. Date: Sep. 30, 2021

(65) Prior Publication Data
US 2023/0203792 A1    Jun. 29, 2023

(30) Foreign Application Priority Data
Mar. 27, 2020   (DE) .......................... 102020108555.9

(51) Int. Cl.
*E03C 1/04*    (2006.01)

(52) U.S. Cl.
CPC ........ *E03C 1/0404* (2013.01); *E03C 2201/45* (2013.01)

(58) Field of Classification Search
CPC ........... B05B 1/14; B05B 1/16; B05B 5/1633; E03C 1/0404; E03C 2201/45
(Continued)

(56) References Cited

U.S. PATENT DOCUMENTS

| 5,871,029 A * | 2/1999 | Peteri .................... E03C 1/0411 4/678 |
| 8,763,175 B2 * | 7/2014 | Li .......................... E03C 1/0402 4/677 |

(Continued)

FOREIGN PATENT DOCUMENTS

| DE | 20 2006 004 399 | 7/2007 |
| DE | 20 2016 000 472 | 4/2017 |

(Continued)

OTHER PUBLICATIONS

DE202006004399 Google Translated English (Year: 2007).*
(Continued)

*Primary Examiner* — Chee-Chong Lee
(74) *Attorney, Agent, or Firm* — Wenderoth, Lind & Ponack, L.L.P.

(57) ABSTRACT

An outlet element for a drinking-water dispenser containing a first water route formed by the outlet element and opening on a first exit plane, water flowing through the first water route being dispensed via the outlet element, a second water route formed by the outlet element and opening on a second exit plane, water flowing through the second water route being dispensed via the outlet element, the second water route differing at least sectionally from the first water route, a third water route formed by the outlet element and opening on a third exit plane, water flowing through the third water route being dispensed via the outlet element, the third water route extending separately from the first water route and the second water route through the outlet element and the third exit plane having a distance of at least 1 mm from the first exit plane and the second exit plane.

11 Claims, 3 Drawing Sheets

Figure 1:
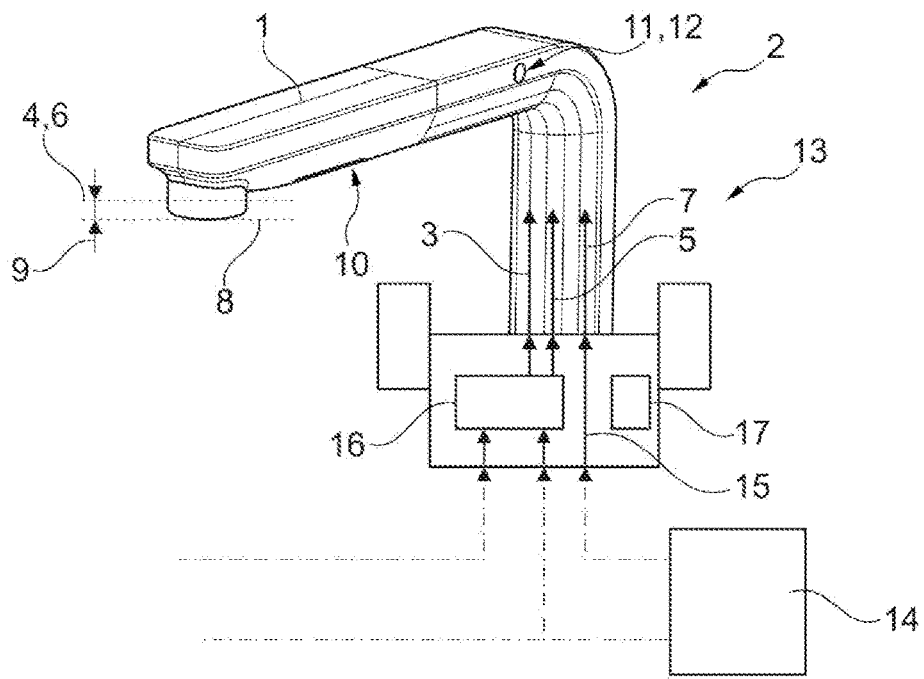

(58) Field of Classification Search
USPC .......................................................... 239/436
See application file for complete search history.

(56) References Cited

U.S. PATENT DOCUMENTS

| | | | | |
|---|---|---|---|---|
| 9,206,917 | B2* | 12/2015 | Lin | ..................... E03C 1/0403 |
| 10,968,613 | B2* | 4/2021 | Stein | ..................... E03C 1/0404 |
| 2003/0010721 | A1* | 1/2003 | Aldred | ..................... E03C 1/04 |
| | | | | 210/85 |
| 2013/0248019 | A1* | 9/2013 | Frick | ..................... E03C 1/057 |
| | | | | 137/468 |
| 2014/0250590 | A1* | 9/2014 | Keiter | ..................... E03C 1/055 |
| | | | | 4/678 |
| 2019/0032309 | A1 | 1/2019 | Stein | |

FOREIGN PATENT DOCUMENTS

| | | |
|---|---|---|
| DE | 10 2017 129 333 | 6/2019 |
| EP | 3 533 937 | 9/2019 |
| EP | 3 587 679 | 1/2020 |

OTHER PUBLICATIONS

International Search Report issued Jun. 2, 2021, in International (PCT) Application No. PCT/EP2021/055194, with English translation.

* cited by examiner

OUTLET ELEMENT FOR A DRINKING WATER DISPENSER

This invention relates to an outlet element for a drinking-water dispenser, which can be used to optionally dispense at least partially treated drinking water or mixed water from the outlet element, a drinking-water dispenser for dispensing optionally at least partially treated drinking water or mixed water, a method for dispensing at least partially treated drinking water having such a drinking-water dispenser, and a use of such an outlet element for optionally dispensing drinking water or mixed water. The invention is used in particular in connection with kitchen faucets.

Drinking-water dispensers for the on-demand dispensing of at least partially treated, for instance filtered, cooled and/or carbonated drinking water are known. These usually feature a water faucet and a drinking-water treatment device. The water faucet is often a kitchen faucet and/or sink faucet. The drinking-water treatment device is typically set up to filter, cool, and/or carbonate water generally originating from a cold-water line. The drinking water, which may contain carbon dioxide, can then be routed from the drinking-water treatment device to the water faucet. Within the water fixture, cold water and hot water can also be mixed so the water fixture can discharge mixed water at a water temperature desired by a user.

In known drinking-water dispensers it was observed that, especially in the area of the outlet of the water faucet, an undesired contamination of drinking water by mixed water can occur. For instance, after a discharge of mixed water, mixed water residue may still be present in and/or at the outlet, which may enter the drinking water jet during a subsequent dispensing of drinking water through the outlet, for instance be carried along by the jet. In addition, in known drinking-water dispensers, where the discharge of drinking water and mixed water can often be triggered independently by a user, it cannot be avoided that drinking water and mixed water can be discharged from the outlet at the same time. This can also contribute to an adverse impact on the drinking water quality of the discharged drinking water.

Based thereon, this invention addresses the problem of at least partially solving the problems indicated with reference to the prior art. In particular, an outlet element for a drinking-water dispenser, which can be used to optionally dispense at least partially treated drinking water or mixed water from the outlet element, a drinking-water dispenser for dispensing optionally at least partially treated drinking water or mixed water, a method for dispensing at least partially treated drinking water using such a drinking-water dispenser, and a use of such an outlet element for optionally dispensing drinking water or mixed water, each of which at least contributes to improving the drinking-water quality of drinking water discharged by means of the drinking-water dispenser shall be specified.

These problems are solved by the features of the independent claims. Further advantageous embodiments of the solution proposed here are specified in the dependent claims. It will be appreciated that the features listed individually in the dependent claims may be combined in any technologically useful manner and define further embodiments of the invention. In addition, the features indicated in the claims are further specified and explained in the description, wherein further preferred embodiments of the invention are illustrated.

An outlet element for a drinking-water dispenser, which can be used to optionally dispense at least partially treated drinking water or mixed water from the outlet element, contributes to solving the problem, wherein a first water route is formed by the outlet element and opens into a first exit plane, from which water flowing through the first water route can be dispensed via the outlet element, wherein a second water route is formed by the outlet element and opens into a second exit plane, from which water flowing through the second water route can be dispensed via the outlet element, wherein the second water route differs at least sectionally from the first water route, wherein a third water route is formed by the outlet element and opens into a third exit plane, from which water flowing through the third water route can be dispensed via the outlet element, wherein the third water route extends (completely) separately from the first water route and the second water route through the outlet element, and wherein the third exit plane is at least 1 mm [millimeter] apart from the first exit plane and from the second exit plane.

The outlet element can be, for instance, shaped like a pull-down sprayer. The three water routes advantageously permit the outlet element to form three water outlets, such that on the one hand (filtered) drinking water and on the other hand mixed water can be discharged in different spray patterns. The three water routes can each extend from an inlet area of the outlet element that can be connected to a base element of a water faucet, for instance, to their respective exit planes. The first water route and the second water route may (initially) extend at least sectionally in a common channel of the outlet element and then branch into separate (first and second) channels of the outlet element. The third water route extends in a (third) channel of the outlet element, which is (completely) separated from the channels of the first and second water routes. For instance, the mouth of the first water route in the first exit plane can be shaped to discharge an at least partially laminar (mixed) water jet. The mouth of the second water route in the second exit plane can be shaped, for instance, to discharge a shower jet or rain jet (of mixed water). For instance, the mouth of the second water route may include a plurality of apertures, which, by way of example, may be arranged (spaced apart from one another) along a circumference around the mouth of the first water route. The mouth of the third water route in the third exit plane can be shaped, for instance, to discharge a spatially concentrated (drinking) water jet. For instance, the mouth of the third water route may have a (single) opening, which may, by way of example, be located at a particular point on a (or the) circumference around the mouth of the first water route. In particular, the openings of the mouth of the second water route and the opening of the mouth of the third water route may be located on the same circumference.

The first exit plane may be oriented in parallel to the second exit plane. For instance, the first exit plane and the second exit plane can also be on the same plane. The third exit plane may be oriented in parallel to the first exit plane and/or in parallel to the second exit plane. The distance of the third exit plane to the first exit plane and the second exit plane makes for a particularly advantageous separation or segregation of the (filtered) drinking water from (possibly contaminated) mixed water. Thus, the distance advantageously contributes to improving the drinking-water quality of drinking water discharged by means of the drinking-water dispenser.

According to an advantageous embodiment, it is proposed that the third exit plane is at least 3 mm [millimeters] apart from the first exit plane and from the second exit plane. For instance, the third exit plane can be at least 3 mm [millimeters] apart from the first exit plane and from the second exit plane. A larger distance, if necessary, even of at least 5 mm or even at least 10 mm, can contribute in particular to the fact that a drinking water jet leaving the outlet element can be better delimited or distanced from possible contacts with mixed water.

According to a further advantageous embodiment, it is proposed that the outlet element comprises a mechanical control element for the manual selection of either the first water route or the second water route. For instance, the mechanical control element may include a manually (and mechanically) operable button, such as a rocker button. The operating element can act (mechanically) on a (mechanical or electronic) control element, such as at least one valve and/or a diverter, integrated in particular in the outlet element, to choose between a flow through the first water route and a flow through the second water route. For instance, a first control element (first valve) may be provided to release the first water route and a second control element (second valve) may be provided to release the second water route. The mechanical control element can be set up as a common control element for the first control element and the second control element. The mechanical control element can advantageously be provided and set up for changing the spray patterns (laminar jet/mousseur jet, rain jet) of the mixed water.

According to a further advantageous embodiment, it is proposed that the outlet element comprises an electronic control element for the manual selection of the third water route. The electronic control element can thus advantageously be arranged in an upper area of the water faucet. For instance, the electronic control element may be an electronic sensor, such as a touch-sensitive sensor. It can be designed, for instance, as a capacitive sensor. However, it is particularly advantageous if the electronic control element comprises a non-contact (electronic) sensor. The non-contact sensor can advantageously enable the drinking-water dispensers to be operated as easily and/or hygienically as possible. This can be, for instance, an optical and/or acoustic sensor. For instance, an optical sensor can detect the presence of a user's hand in the area of the sensor and identify this, in particular, as a signal to dispense drinking water. An acoustic sensor can, for instance, detect at least one (specific) pronounced word of a user and, in particular, identify it as a signal for dispensing drinking water. The electronic control element can act (electronically) on a (mechanical or electronic) (third) control element, such as at least one (third) valve, integrated in particular in the outlet element, to release a flow through the third water route.

According to a further aspect, a drinking-water dispenser for dispensing selectively at least partially treated drinking water or mixed water is proposed, comprising a water faucet having an outlet element according to any one of the preceding claims, from which the drinking water or the mixed water can be selectively dispensed, and a drinking-water treatment device that can be connected to a drinking-water channel of the water faucet, wherein the first water route and the second water route of the outlet element can be connected to a mixing chamber of the water faucet and wherein the third water route of the outlet element can be connected to the drinking-water channel.

For instance, the water faucet may be a kitchen faucet, such as a sink faucet. For instance, the outlet element may be connected to a base element of the water faucet via a connection point. For instance, a screw connection can be formed at the connection point. The base element typically includes the valve components of the water fixture and can be typically mounted on a plate, such as a kitchen countertop and/or sink. Furthermore, the outlet element can be rotated relative to the base element of the water faucet. For this purpose, the outlet element can be rotatably mounted on the base element at the connection point, for instance. Typically, the mixing chamber is located in the base element. Furthermore, the drinking-water channel may be formed in the base element. In the mixing chamber, cold water coming from a cold-water pipe and hot water coming from a hot water pipe can be mixed (via the valve components) according to a temperature preselected by the user. The drinking-water treatment device may include a carbonation device by means of which the water can be enriched with carbonic acid. The drinking-water treatment device may further include a filter for improving the quality of drinking water and/or a cooler for providing particularly cold drinking water.

According to an advantageous embodiment, it is proposed that the drinking-water dispenser comprises a control device, which is provided and set up to check whether the drinking-water dispenser is currently used to dispense mixed water and to enable dispensing of drinking water using the drinking-water dispenser only if the drinking-water dispenser is currently not being used to dispense mixed water. The control device can be formed, for instance, by an electronic control unit (controller). For instance, the control device can be provided and set up for an alternative selection of drinking water and mixed water. For instance, the control device can include and/or access a sensor that can detect a presence of mixed water in the outlet element and/or that can detect a user selection of a mixed water discharge, for instance, by detecting a corresponding motion and/or position of a control element of the water fixture for the user to select a mixed water discharge. The control device may further include and/or access an actuator for releasing a flow of drinking water, such as for releasing the flow of water through the third water route. The control device may further comprise and/or access an (or the) electronic control element for detecting a user request to dispense drinking water. The control device can advantageously contribute to the avoidance of simultaneous use of mixed water and drinking water, in particular by means of appropriately designed (intelligent) electronics. In particular, the control device can be provided and set up to prevent (filtered) drinking water from exiting the drinking-water dispenser at the same time as the mixed water. This can also help improve the quality of the drinking water that can be discharged from the drinking-water dispenser. It is also possible to specify here (independently of the other elements of the drinking-water dispenser) such a control device for such a drinking-water dispenser.

According to a further aspect, a method for using a drinking-water dispenser to tap at least partially treated drinking water described herein is proposed, comprising at least the steps outlined below:
 a) recognize a user request to dispense drinking water,
 b) check whether the drinking-water dispenser is currently being used to tap mixed water,
 c) open a flow of drinking water through the third water route if the drinking-water dispenser is currently not being used to tap mixed water.

Steps a), b), and c) may be performed at least once in the order indicated to perform the method. The procedure can be performed, for instance, by means of a control device of (or for) the drinking-water dispenser.

According to an advantageous embodiment, it is proposed that the user's request to dispense drinking water is detected using a non-contact sensor. For this purpose, the sensor can, for instance, transmit a prompt signal to a control device of the drinking-water dispenser.

In particular, an electronic sensor (in the upper part of the outlet) can be used to activate (filtered) drinking water. A controller or the control device can detect whether mixed water is being tapped. Thus, advantageously, the simultaneous activation of the (filtered drinking) water and the mixed water is not possible. If or as soon as no (more) mixed water is tapped, the sensor can activate or tap the filtered drinking water. For an advantageous change of the spray patterns (laminar jet, shower jet) of the mixed water, a mechanical control element can be operated manually at the outlet element.

According to a further aspect, a use of an outlet element described herein for selectively dispensing drinking water via the third water route or mixed water via the first water route or via the second water route is proposed.

The details, features and advantageous embodiments discussed in connection with the outlet element may similarly also occur in the drinking-water dispenser, method and/or use presented herein, and vice versa. In this respect, reference is made in full to the explanations given there for a more detailed characterization of the features.

Figure 2:
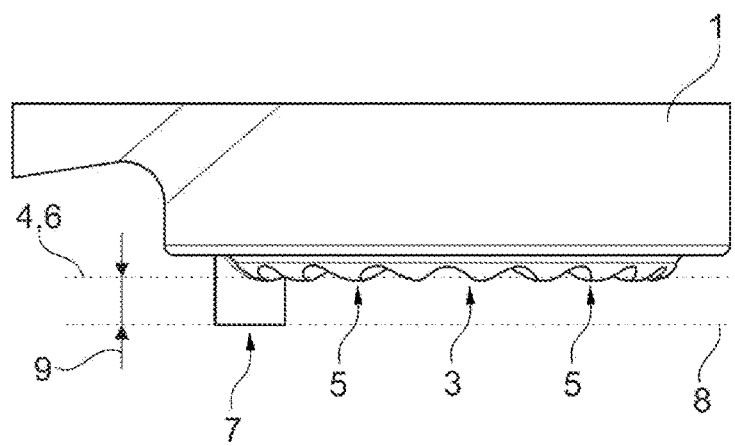
Figure 3:
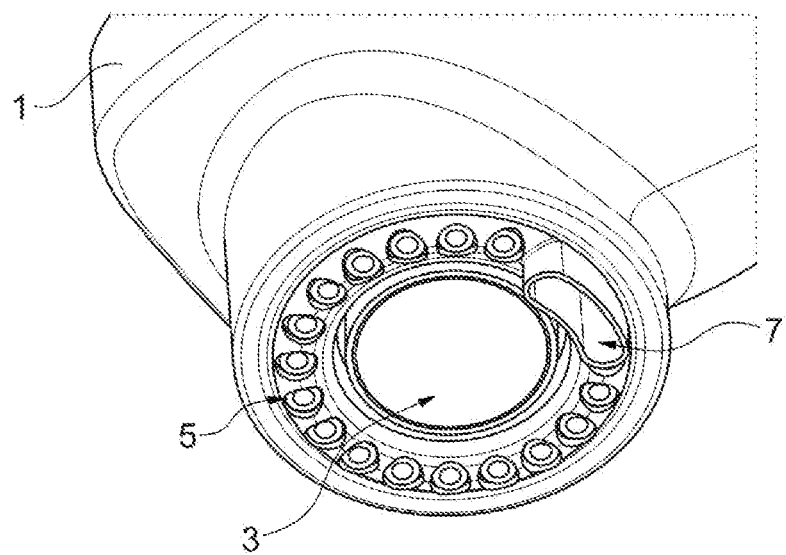
Figure 4:
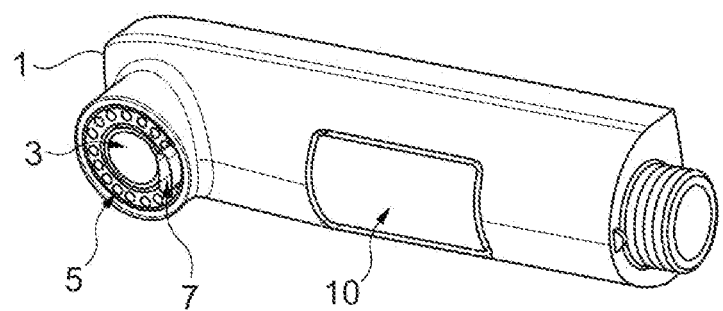
Figure 5:
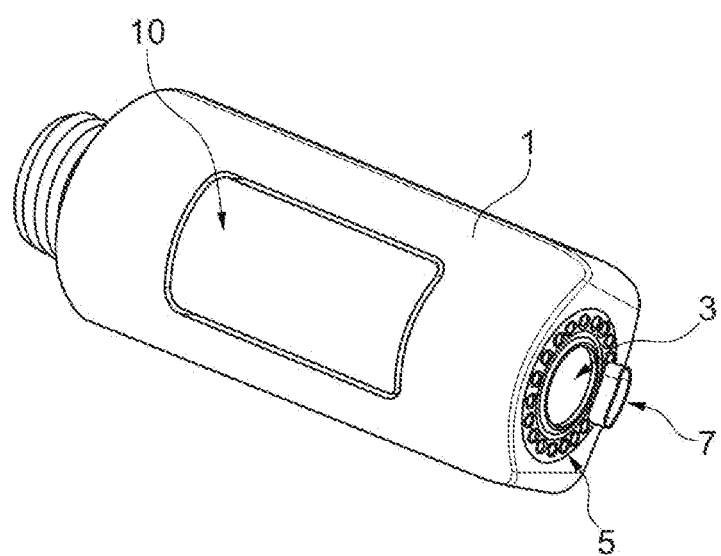

The invention and its technical environment presented here are explained in more detail below with reference to the figures. It should be noted that the invention is not intended to be restricted by the shown exemplary embodiments. In particular, unless explicitly stated otherwise, it is also possible to extract partial aspects of the facts explained in or in the context of the Figures and combine them with other components and/or findings from other Figures and/or this description. In an exemplary and schematic manner FIG. 1 shows a perspective view of a drinking-water dispenser described here, FIG. 2 shows a detailed side view of an outlet element described here, FIG. 3 shows a detailed perspective view of an outlet element described here, FIG. 4 shows a perspective view of an example of an outlet element described here, and FIG. 5 shows a perspective view of a further example of an outlet element described here.

FIG. 1 schematically shows a perspective view of a drinking-water dispenser 2 described herein, by way of example. The drinking-water dispenser 2 is used to dispense optionally at least partially treated drinking water or mixed water. The drinking-water dispenser 2 has a water faucet 13 with an outlet element 3 described herein, which can be used to dispense either the drinking water or the mixed water, and a drinking-water treatment device 14, which can be connected to a drinking-water channel 15 of the water faucet 13. The drinking-water dispenser 2 can be used in a kitchen, for instance. The water faucet 13 may be, for instance, a kitchen faucet, such as a sink faucet. The drinking-water treatment device 14 may, by way of example, be provided and arranged for filtering, cooling and/or carbonating (cold) water.

The outlet element 1 forms a first water route 3. The first water route 3 opens into a first exit plane 4, from which (mixed) water flowing through the first water route 3 can be dispensed via the outlet element 1. The outlet element 1 forms a second water route 5. The second water route 5 opens into a second exit plane 6, from which (mixed) water flowing through the second water route 5 can be dispensed via the outlet element 1. The second water route 5 differs at least sectionally from the first water route 3. The outlet element 1 forms a third water route 7. The third water route 7 opens into a third exit plane 8, from which (drinking) water flowing through the third water route 7 can be dispensed via the outlet element 1. The third water route 7 extends (completely) separately from the first water route 3 and the second water route 5 through the outlet element 1.

The third exit plane 8 has a distance 9 of at least 1 mm, in this case by way of example even of at least 3 mm to the first exit plane 4 and the second exit plane 6. However, the first exit plane 4 and the second exit plane 6 can basically lie on the same plane, as illustrated here by way of example. The distance 9 advantageously contributes to a good separation of the (treated) drinking water from the (possibly contaminated) mixed water.

The first water route 3 and the second water route 5 of the outlet element 1 can be connected to a mixing chamber 16 of the water faucet 13. The third water route 5 of the outlet element 1 can be connected to the drinking-water channel 15. Thus, an advantageously separate routing of mixed water and (treated) drinking water can be implemented inside the drinking-water dispenser 2. Thus, the outlet element 1 described herein can be used to selectively dispense (treated) drinking water via the third water route 8 or mixed water via the first water route 3 or the second water route 5.

FIG. 1 further illustrates that the outlet element 1 can have a mechanical operating element 9 for a manual selection of either the first water route 3 or the second water route 5. The mechanical control element 9 may be formed, for instance, as a rocker button for manual switching between a laminar jet and a shower jet.

FIG. 1 further shows that the outlet element 1 may comprise an electronic control element 11 for the manual selection of the third water route 5. For instance, the electronic control element 11 may comprise a non-contact sensor 12. For instance, the sensor 12 may be provided and set up for (electronically) activating a delivery of (treated) drinking water.

The dashed lines in FIG. 1 indicate that, for instance, cold water can be supplied to both the water faucet 13 (directly) and to the drinking-water treatment device 14. In addition, hot water can also be supplied (directly) to the water faucet 13 to be able to generate mixed water at a desired temperature in the mixing chamber 16 of the water faucet 13. The connection of the drinking-water treatment device 14 to the supply of cold water and the connectivity of the drinking-water treatment device 14 to the third water route 7 can be used in an advantageous manner for discharging treated, for instance filtered, cooled and/or carbonated, drinking water on demand by means of the drinking-water dispenser 2.

The drinking-water dispenser 2 may further comprise, for instance, a control device 17, which is provided and set up to check whether mixed water is currently being dispensed by the drinking-water dispenser 2. In addition, the control device 17 can be provided and set up to permit the tapping of drinking water using the drinking-water dispenser 2 only if the drinking-water dispenser 2 is currently not being used to tap mixed water.

In particular, the control device 7 can be used to perform a method for dispensing at least partially treated drinking water using the drinking-water dispenser 2 described herein, following at least the steps outlined below: A user request to dispense drinking water may be detected, for instance, via a signal from the electronic control element 11 or the sensor 12. Thus, by way of example, a non-contact sensor 12 may be used to perform the detection of the user request to dispense drinking water. After that, it can be checked whether the drinking-water dispenser 2 is currently being used to tap mixed water. Thereafter, a release of a flow of drinking water through the third water route 7 can occur if the drinking-water dispenser 2 is not currently being used to tap mixed water.

FIG. 2 schematically shows a detailed side view of an outlet element 1 described here by way of example. The reference numerals are used uniformly to be able to make reference to the explanations above. In FIG. 2, the distance 9 from the third exit plane 8 to the first exit plane 4 and the second exit plane 6 can be seen particularly well.

FIG. 3 schematically shows a detailed perspective view of an outlet element 1 described here by way of example. The reference numerals are used uniformly to be able to make reference to the explanations above. In FIG. 3, the view from below is directed towards the different mouths of the various water routes 3, 5, 7. For instance, a laminar jet (of mixed water) may be discharged from the outlet element 1 through the mouth of the first water route 3. Furthermore, for instance, a shower jet (of mixed water) can be discharged from the outlet element 1 through the mouth of the second water route 5. Thus, the first water route 3 and the second water route 5 may differ from each other at least in the area of their respective mouths or in their respective end sections or mouth sections. In addition, by way of example, (treated) drinking water can be discharged from the outlet of the third water route 7 from the outlet element 1.

FIG. 4 schematically shows a perspective view of an outlet element 1 described herein by way of example. The reference numerals are used uniformly to be able to make reference to the explanations above. FIG. 4 illustrates an exemplary arrangement of the control element 10. In addition, FIG. 4 shows an example of the outlet element 1, in which the water routes 3, 5, 7 exit from the outlet element 1 with a downward directional component.

FIG. 5 schematically shows a perspective view of a further example of an outlet element 1 described here by way of example. The reference numerals are used uniformly to be able to make reference to the explanations above. FIG. 5 shows an example of outlet element 1. in which the water routes 3, 5, 7 exit from the outlet element 1 with a forward directional component.

Thus an outlet element for a drinking-water dispenser, which can be used to optionally dispense at least partially treated drinking water or mixed water from the outlet element, a drinking-water dispenser for dispensing optionally at least partially treated drinking water or mixed water, a method for dispensing at least partially treated drinking water using such a drinking-water dispenser, and a use of such an outlet element for optionally dispensing drinking water or mixed water can be specified, which at least partially solve the problems described with reference to the prior art. In particular an outlet element for a drinking-water dispenser, which can be used to optionally dispense at least partially treated drinking water or mixed water from the outlet element, a drinking-water dispenser for dispensing optionally at least partially treated drinking water or mixed water, a method for dispensing at least partially treated drinking water using such a drinking-water dispenser, and a use of such an outlet element for optionally dispensing drinking water or mixed water, each of which at least contributes to improving the drinking-water quality of drinking water discharged by means of the drinking-water dispenser, can be specified.

LIST OF REFERENCE NUMERALS

1 outlet element
2 drinking-water dispenser
3 first water route
4 first exit plane
5 second water route
6 second exit plane
7 third water route
8 third exit plane
9 distance
10 mechanical control element
11 electronic control element
12 sensor
13 water faucet
14 drinking-water treatment device
15 drinking-water channel
16 mixing chamber
17 control device

The invention claimed is:

1. A drinking water dispensing system (2) that selectively dispenses at least partially treated drinking water or tap water, the drinking water dispensing system (2) comprising:
   a water faucet (13) having an outlet element (1) from which the at least partially treated drinking water or the tap water can be selectively dispensed,
   a drinking-water treatment device (14) operatively connected to a drinking-water channel (15) of the water faucet (13), the drinking-water treatment device (14) being configured to supply the at least partially treated drinking water,
   a mixing chamber (16) configured to adjust the temperature of the tap water, and
   a control device (17) configured to check whether the tap water is being dispensed by the drinking water dispensing system (2) and to allow dispensing of the at least partially treated drinking water only when no tap water is being dispensed by the drinking water dispensing system (2),
   wherein the outlet element (1) comprises:
   a first water route (3) that extends from the outlet element (1) to a first exit plane (4) from which the tap water flowing through the first water route (3) can be dispensed from the outlet element (1),
   a second water route (5) that extends from the outlet element (1) to a second exit plane (6) from which the tap water flowing through the second water route (5) can be dispensed via the outlet element (1),
      wherein the first water route (3) and the second water route (5) are channels formed within the outlet element (1), and
   a third water route (7) that extends from the outlet element (1) to a third exit plane (8) from which at least partially treated drinking water flowing through the third water route (7) can be dispensed via the outlet element (1),
      wherein the third water route (7) is a channel formed within the outlet element (1) that is separated from the first water route (3) and the second water route (5),
   wherein the third exit plane (8) extends from the outlet element (1) to a distance (9) that is at least 1 mm beyond the first exit plane (4) and the second exit plane (6),
   wherein the first water route (3) and the second water route (5) are operatively connected to the mixing chamber (16), and
   wherein the third water route (7) of the outlet element (1) is operatively connected to the drinking-water channel (15).

2. The drinking water dispensing system (2) according to claim 1, wherein the first water route (3), the second water route (5), and the third water route (7) exit from the outlet element (1) in a common direction.

3. The drinking water dispensing system (2) according to claim 2, wherein the common direction is a downward direction.

4. The drinking water dispensing system (2) according to claim 2, wherein the common direction is a forward direction.

5. The drinking water dispensing system (2) according to claim 1, wherein the distance (9) is at least 3 mm.

6. The drinking water dispensing system (2) according to claim 1, wherein the outlet element (1) further comprises a mechanical control element (10) for the manual selection of either the first water route (3) or the second water route (5).

7. The drinking water dispensing system (2) according to claim 1, wherein the outlet element (1) comprises an electronic control element (11) for the manual selection of the third water route (5).

8. The drinking water dispensing system (2) according to claim 7, wherein the electronic control element (11) comprises a non-contact sensor (12).

9. The drinking water dispensing system (2) according to claim 1, wherein the at least partially treated drinking water comprises filtered, cooled and/or carbonated drinking water.

10. A method of dispensing at least partially treated drinking water, comprising the steps outlined below:
  a) providing the drinking-water dispenser (2) according to claim 1,
  b) recognizing a user request to dispense the at least partially treated drinking water,
  c) checking whether the drinking-water dispenser (2) is currently being used to dispense the tap water, and
  d) opening a flow of the at least partially treated drinking water through the third water route (7) only if the drinking-water dispenser (2) is currently not being used to dispense the tap water.

11. The method of claim 10, wherein a non-contact sensor (12) is used to detect the user request to dispense the at least partially treated drinking water.

* * * * *